2 Sheets—Sheet 1.
K. KNOTT.
SLAUGHTERING APPARATUS.
No. 181,688. Patented Aug. 29, 1876.
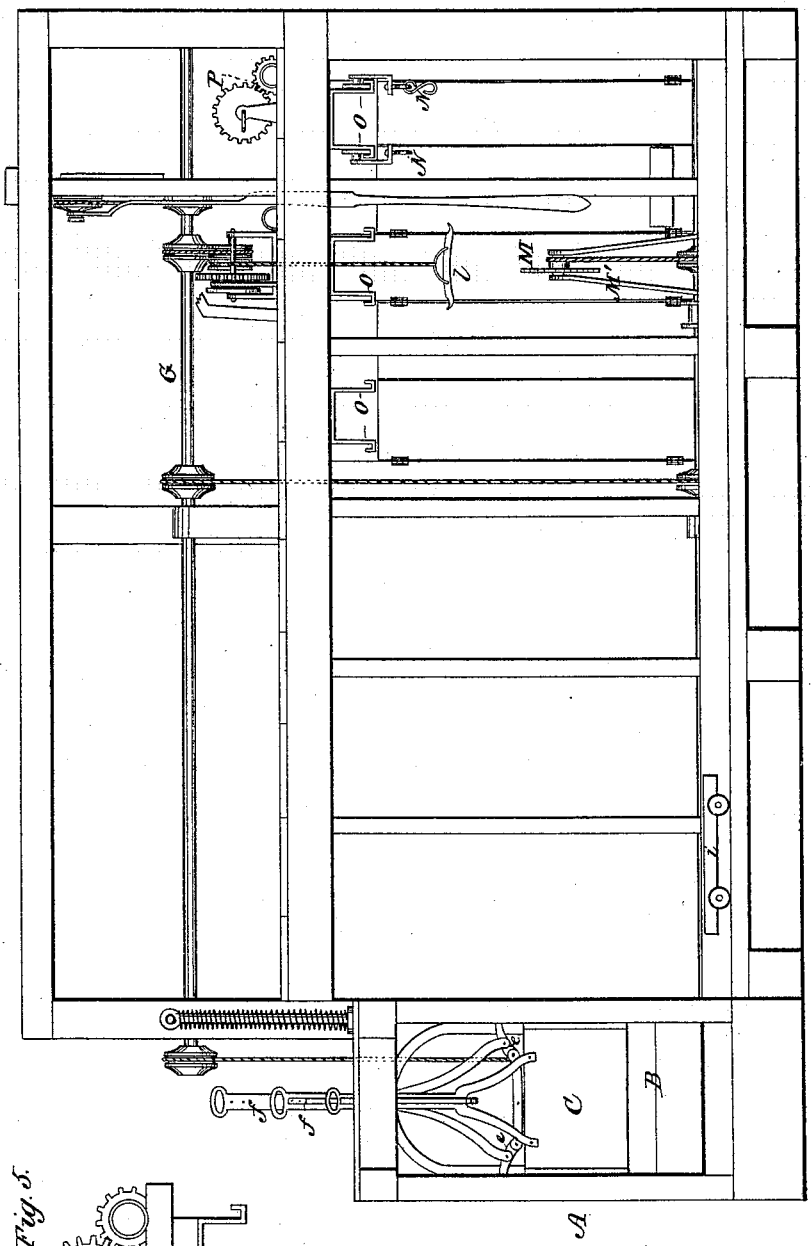
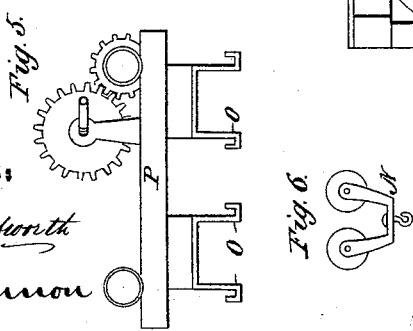
WITNESSES:
W. W. Hollingsworth
John C. Kennon
INVENTOR:
Kennard Knott
BY
[signature]
ATTORNEYS.
N. PETERS, PHOTO-LITHOGRAPHER, WASHINGTON, D. C.

2 Sheets—Sheet 2.
K. KNOTT.
SLAUGHTERING APPARATUS.
No. 181,688. Patented Aug. 29, 1876.
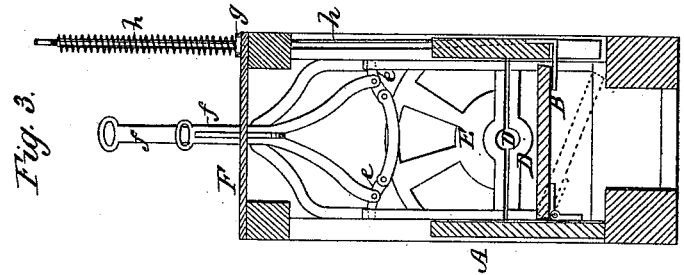
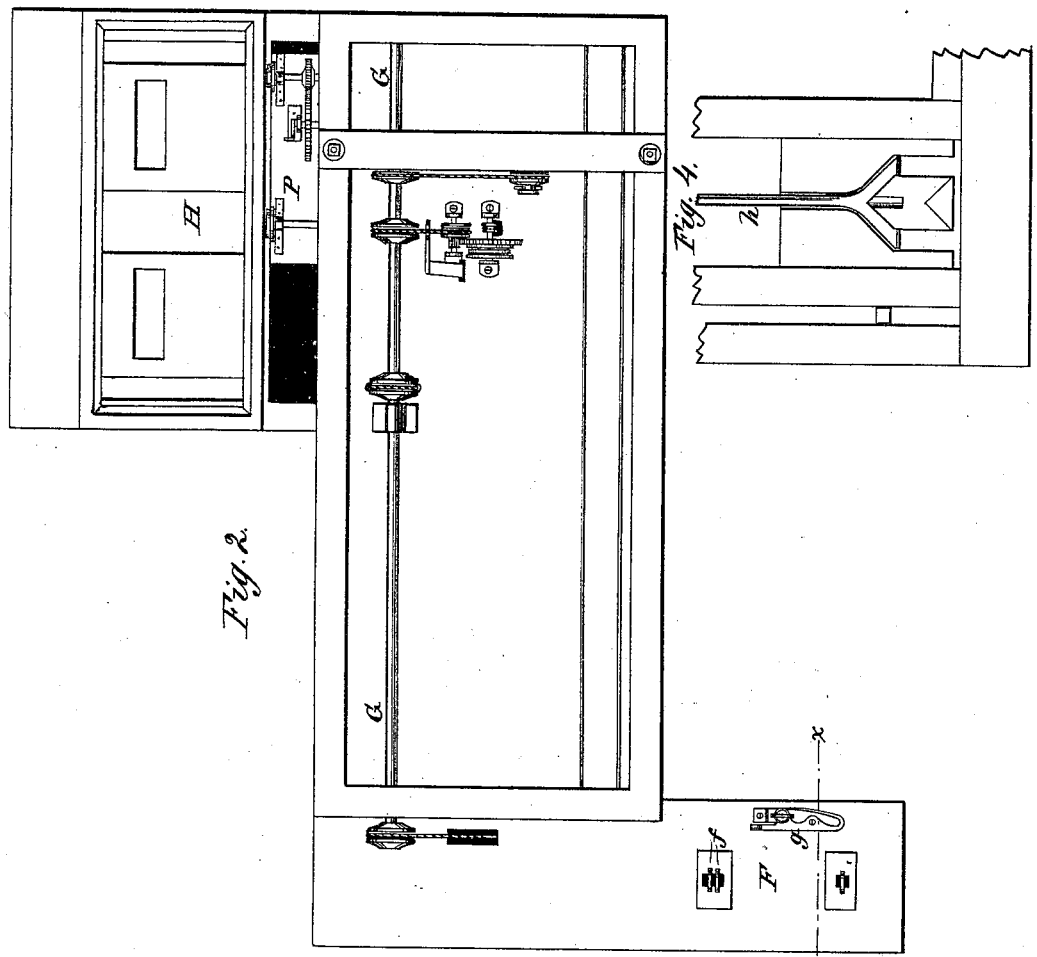
WITNESSES:
W. W. Hollingsworth
John A. Kernon
INVENTOR:
Kennard Knott
BY
Keuen & Co.
ATTORNEYS.

UNITED STATES PATENT OFFICE.

KENNARD KNOTT, OF LONDON, ONTARIO, CANADA.

IMPROVEMENT IN SLAUGHTERING APPARATUS.

Specification forming part of Letters Patent No. 181,688, dated August 29, 1876; application filed March 19, 1875.

*To all whom it may concern:*

Be it known that I, KENNARD KNOTT, of the city of London, in the county of Middlesex, in the Province of Ontario, Canada, have invented an Improved Slaughtering and Transferring Apparatus and Packing-House, of which the following is a specification:

The invention relates to an improved slaughtering apparatus, by which the bullock is thrown down and, after being killed, drawn out and deposited upon a car, which transports the body to the mechanism by which it is hoisted for being dressed. After the dressing operation it is lowered and divided in halves. The two parts, which are still suspended from hanging tramways by wheel-hooks, are quickly conveyed by said hooks, via the tramways, into the freezing-house, as hereinafter more fully described.

Figure 1 is a front elevation of my improved slaughtering apparatus. Fig. 2 is a plan view of the same. Fig. 3 is a cross-section on line *x x* of Fig. 2. Figs. 4, 5, 6 are detail views.

The bullock to be slaughtered is driven into the stall A, upon the trap-floor B, and the drop-door C closed behind it. The bullock will now, of its own accord, push its head forward, so that it projects over the lower half D, Fig. 3, of the drop-door in front. The upper half E is then lowered upon its neck, so that the head is held in the circle or collar D', formed by the half-round openings in the parts D and E.

Men are stationed on the upper platform F, to operate the door-sections D E by means of handles *f*, which are each provided with spring-catches to hold them elevated. Eccentric catches or pawls *e e* serve to prevent the door-sections D E being raised by the lift of the animal's head.

The next step is to throw the bullock on its side, which is done by dropping one side of the hinged floor B to the position indicated by dotted lines, Fig. 3. This is effected by releasing the spring-lever catch *g*, Fig. 2, from the rod *h*, which is encircled by a spiral spring, extends down through the platform F, and is suitably connected with floor B, Figs. 3 and 4.

While lying on its side the bullock is killed by a blow from a pole-axe or other suitable instrument, and, the lower half D of the door being dropped, the carcass is drawn out by a chain attached to a windlass, (not shown,) operated by suitable band-connection with shaft G.

After having been bled, the carcass is transported upon a car, *i*, (running on trams or rails along the front of a series of slaughtering-stalls,) to a supplementary slaughtering apparatus, where it is elevated by a winch and dressed, and then divided lengthwise into halves by being pushed against a circular saw, M. This saw is supported by an upright frame, M', constructed to vibrate or move backward and forward in such manner as to work freely in the hands of the operator, and, when out of hand, the frame M' is maintained in a vertical position by a counterbalance-weight below the platform.

The halves of the carcass, thus divided by the saw, are next suspended from wheel-hooks N, running on trams or guttered rails O, attached to the ceiling, and on these hooks they are transferred to corresponding rails on a car, P, Figs. 2 and 5, which is moved along the front of the freezing-house H.

While suspended from the car P, the latter is moved to bring its rails into coincidence with the rails which are attached to the ceiling of the house H, and thus the wheel-hooks N, bearing the suspended carcass, may be run into the house, where the carcass is allowed to remain until frozen, or nearly so, when it is packed for transportation.

The doors of the refrigerating house or chamber H are made in two parts and hung on double hinges, so that they open either inward or outward, and thus allow the divided carcass to be readily passed in or out.

I claim—

1. The combination, with the hinged stall-floor G, of the supporting-rod, provided with a spring, *g*, as shown and described.

2. The combination of the vertically-sliding parts D and E of the stall-door, and their catch-rods or handles, operating as specified.

3. The wheel-hooks, the tramways attached to the ceiling both within and without the freezing-house Q, and the car P, having sections of tramways applied to its under side, and running on rails or ways transversely of the tramways, all combined as shown and described, to operate as and for the purpose specified.

Witnesses:  KENNARD KNOTT.
 HENRY A. BEECH,
 PHILIP J. EDMUND.